United States Patent [19]

St. Pierre et al.

[11] Patent Number: 4,762,449
[45] Date of Patent: Aug. 9, 1988

[54] TIE DOWN FITTING

[76] Inventors: Frank H. St. Pierre, 27732 W. Moonridge La., Castaic, Calif. 91310; Jack D. Jensen, P.O. Box 7895, Newport Beach, Calif. 92658

[21] Appl. No.: 73,005

[22] Filed: Jul. 13, 1987

[51] Int. Cl.⁴ .......................... B60P 7/06; F16B 21/00; F16B 45/02
[52] U.S. Cl. ................................ 410/107; 248/499; 403/348; 410/112; 410/116; 296/43
[58] Field of Search ................ 248/499, 503; 403/548; 410/101, 106, 107, 111, 112, 116; 296/43

[56] References Cited

U.S. PATENT DOCUMENTS

| | | | |
|---|---|---|---|
| 61,590 | 1/1867 | Whitmarsh et al. | 248/294 |
| 1,136,286 | 4/1915 | Stafford | 248/290 |
| 2,134,823 | 11/1938 | Herrmann et al. | 248/361 |
| 3,082,990 | 3/1963 | Nelson | 248/308 |
| 3,102,708 | 9/1963 | Crain | 410/107 |
| 3,223,375 | 12/1965 | Bernasconi | 248/361 |
| 3,289,989 | 12/1966 | Ferenz | 248/205 |
| 3,351,356 | 11/1967 | Clark et al. | 410/116 |
| 3,357,670 | 12/1967 | Larson | 248/361 |
| 3,381,925 | 5/1968 | Higuchi | 410/116 |
| 3,385,547 | 5/1968 | West | 248/205 |
| 3,402,961 | 9/1968 | Larson | 296/23 |
| 3,414,226 | 12/1968 | Patnaude | 248/499 |
| 3,421,726 | 1/1969 | Getter | 296/43 UX |
| 3,556,457 | 1/1971 | Patnaude | 248/499 |
| 3,718,946 | 3/1973 | Lunsford et al. | 24/73 |
| 3,779,502 | 12/1973 | Marberg | 410/116 |
| 3,782,775 | 1/1974 | Weiler et al. | 296/23 |
| 3,941,250 | 3/1976 | Ott | 248/294 |
| 3,966,250 | 6/1976 | Winskas | 296/1 |
| 4,295,765 | 10/1981 | Burke | 410/101 |
| 4,531,774 | 7/1985 | Whatley | 410/101 |
| 4,657,299 | 4/1987 | Mahan | 296/43 |

Primary Examiner—George L. Walton
Attorney, Agent, or Firm—Fulwider, Patton, Rieber, Lee & Utecht

[57] ABSTRACT

A tie down fitting adapted to fit within a stake hole in a side wall section of a pickup truck. The fitting includes a clamping plate dimensioned for insertion through the stake hole for engagement with the underside of the wall section. A cover plate engages the upper side of the section and is secured to the clamping plate by threaded fasteners. Aligned slots in the plates receive a hook member for pivotal movement between a recessed position flush with the wall section to a projected position where it is adapted for engagement by a cargo securing line or the like. A number of such fittings enable securement of cargo on the truck bed.

In its recessed position the fitting is pressed to pivot it toward its projected position. Its center of gravity tends to maintain it in either its recessed or its projected position.

6 Claims, 1 Drawing Sheet

U.S. Patent   Aug. 9, 1988   4,762,449
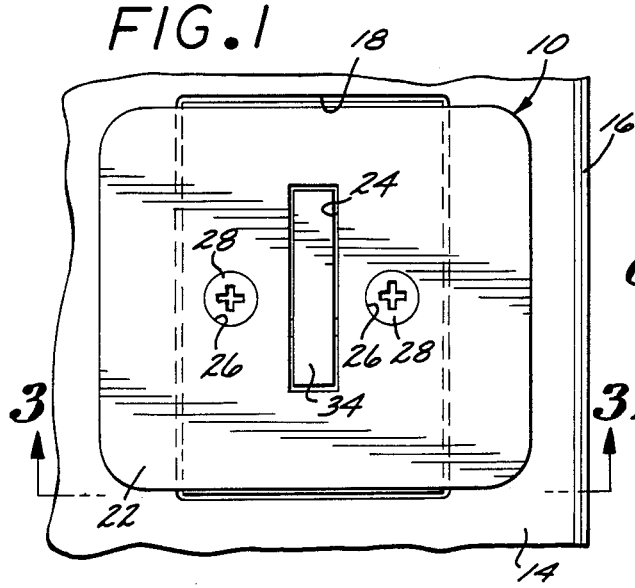
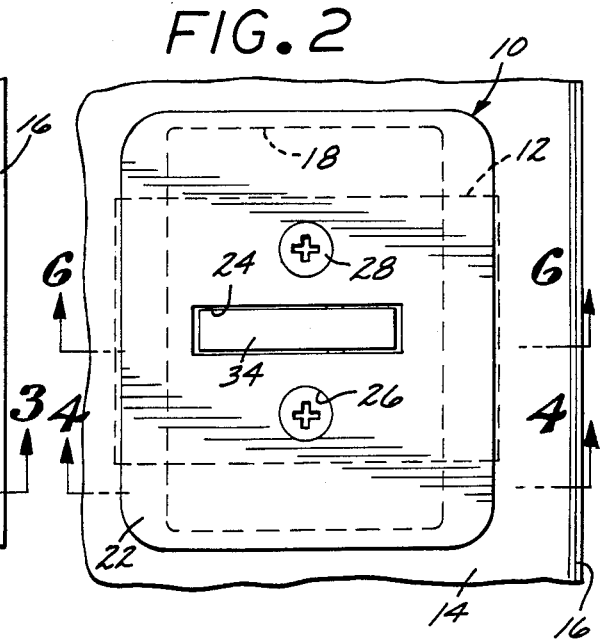
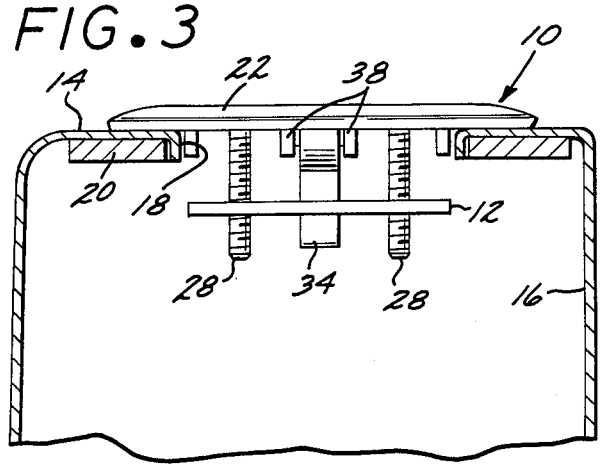
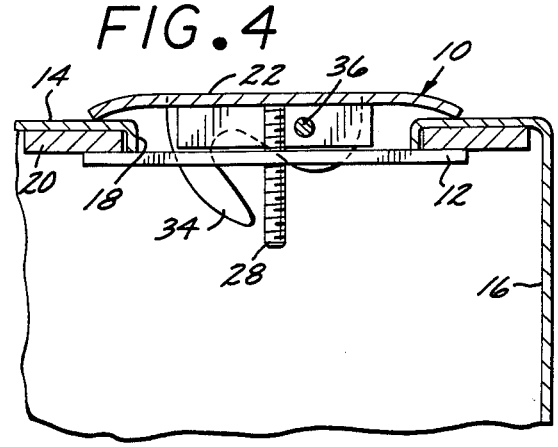
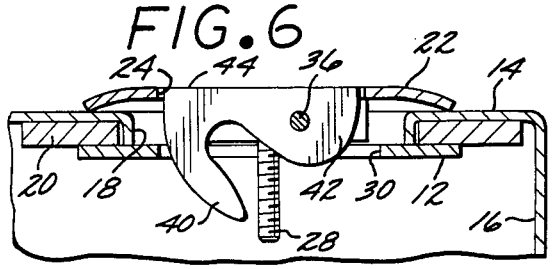
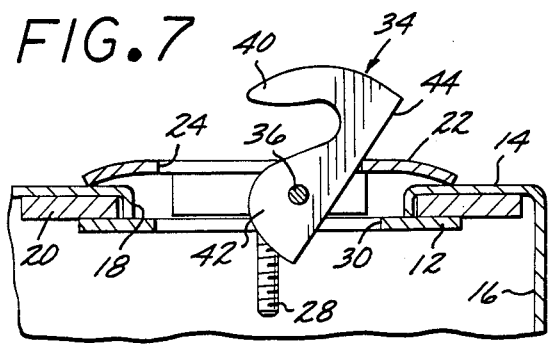
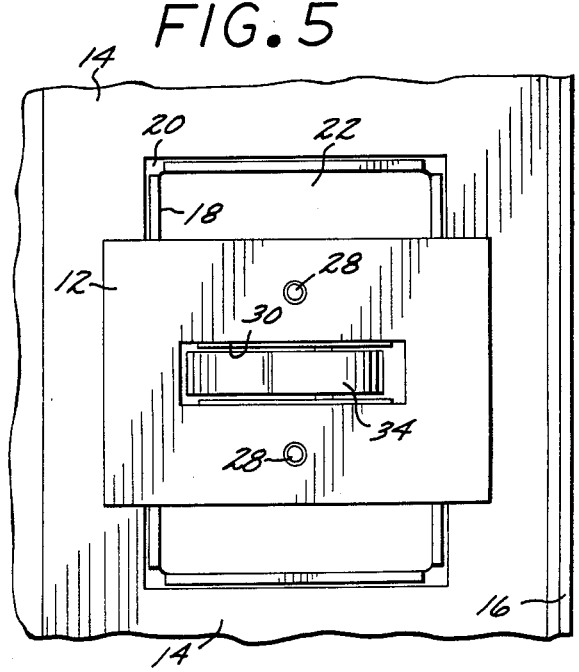

TIE DOWN FITTING

BACKGROUND OF THE INVENTION

1. Field of the Invention

The present invention relates to a tie down fitting and more particularly to a retractable tie down fitting for removable mounting within the stake hole of a pickup truck to aid in securing truck bed cargo.

2. Description of the Prior Art

It is common to use tie downs to secure cargo in place on a pickup truck. The tie downs are fixed around the perimeter of the truck bed to provide anchorages for cargo securing lines.

The usual tie down is in the form of an eye cleat or hook fastened to the truck bed side wall by screws or the like which extend through openings specially drilled in the side wall. Tie downs of this type are illustrated in U.S. Pat. Nos. 3,223,375 (J. E. Bernascone, issued Dec. 14, 1965); 3,357,670 (C. 0. Larson, issued Dec. 12, 1967); and 4,295,765 (Burke, issued Oct. 20, 1981. Proper location of the drilled openings is tedious and time consuming. Further, if bolts are used rather than screws, access to both sides of the side wall section is required.

It is impractical for a truck owner to remove such tie downs for use on another truck because of the semipermanent nature of the installation and because of the unsightly fastener openings which remain.

There is a need for a tie down fitting which can be quickly and removably fitted to a pickup truck side wall without any need for drilling or cutting of the wall. Preferably the fitting should be retractable to a flush relationship with its mounting surface so that it is unobtrusive and out of the way when not in use. However, it should be easily movable to a projected position for engagement by a cargo securing line.

SUMMARY OF THE INVENTION

According to the present invention, a tie down fitting is provided which can be mounted within the standard post or stake hole found in many current models of pickup truck. Using the existing stake hole eliminates any need for specially drilled fastener openings in the truck side wall.

The fitting includes a centrally slotted clamping plate which is dimensioned so that it can be manipulated through the stake hole and into the inside of the side wall. Access from the inside of the side wall is not required. A cover plate is provided for engagement with the outside of the side wall, and fasteners extend between the plates to firmly secure them in position.

A hook member carried within slots provided in the plates is pivotable between a recessed position flush with the cover plate, and a projected position for engagement by a cargo securing line or the like. Simply pressing the hook member in its recessed position pivots it upwardly for use. Its center of gravity tends to maintain the hook member in its recessed or projected position, depending upon its location.

The tie down fitting thus constitutes an inexpensive means for quickly providing a cargo securing line anchorage. There is no need for the cutting or drilling of special fastener holes in the truck side wall, and the fitting can be easily removed at any time for remounting on another truck if desired. When not in use the retracted fitting is aesthetically attractive and does not interfere with other uses of the truck.

Other objects and features of the invention will become apparent from consideration of the following description taken in connection with the accompanying drawings.

BRIEF DESCRIPTION OF THE DRAWINGS

FIG. 1 is a partial top plan view of a horizontal section of a truck bed side wall, showing the present fitting in a preliminary installation position, after maneuvering of the inner or clamping plate through the side wall stake opening and into the side wall interior;

FIG. 2 is a view similar to FIG. 1, but illustrating the fitting rotated 90 degrees into its final installation position;

FIG. 3 is a view taken along the line 3—3 of FIG. 1;

FIG. 4 is a view taken along the line 4—4 of FIG. 2;

FIG. 5 is a bottom plan view of the structure of FIG. 2;

FIG. 6 is a view taken along the line 6—6 of FIG. 3, illustrating the hook member in its recessed position; and FIG. 7 is a view similar to FIG. 6, but illustrating the hook member in its projected position.

DESCRIPTION OF THE PREFERRED EMBODIMENT

Referring now to the drawings, there is illustrated a tie down fitting 10 according to the present invention which comprises, generally, a flat, rectangular clamping plate 12 adapted to engage the underside of a horizontal section 14 of a hollow sheet metal side wall 16 of a pickup truck (not shown).

The section 14 includes a plurality of rectangular post or stake holes, one of which is illustrated at 18. These are punched or otherwise formed through the material of the section. In some pickup trucks the edge margins of the holes are reversely formed to provide a reinforcing bead, but in the side wall structure illustrated the four edge margins of each hole are downwardly deformed to provide flanges. As best seen in FIG. 5, a rectangular reinforcing frame 20 is fitted against these flanges and is welded in position.

In the description which follows, the term "underside" is denotes the inner or underside of the wall section 14, whether it is constituted only of the sheet metal material of the truck side wall, or of such sheet metal plus the reinforcing frame 20.

It is important that the clamping plate 12 be dimensioned so that it can be easily manipulated or maneuvered through the stake hole 18 for engagement with the underside of the section 14. This eliminates any need for access to the inside of the hollow side wall to install the fitting 10.

Since the typical stake hole 18 is rectangular, the plate 12 is easily insertable if it is made rectangular and slightly smaller than the rectangular hole. Once the plate is passed through the hole it can be rotated sideways or 90 degrees, with its long dimension below the short dimension of the hole. Of course, other options are possible, such as tipping the plate 12 to fit it within a narrower hole, or orienting it to fit it diagonally through the hole. The main object is to make the relative dimensions of the plate and hole so that the plate can be fitted through the hole from the outside. As will be seen, this is facilitated when the plate is supported by other parts of the fitting during initial installation.

The fitting 10 further comprises a rectangular cover plate 22 having lateral dimensions slightly larger than the corresponding dimensions of the hole 18 so that in its installed position it is capable of covering the hole and engaging the upper side of the section 14 adjacent the hole margins, in the manner of an escutcheon plate.

The edges of the plate 22 are preferably downwardly rounded or curvilinear to allow objects such as ropes to slide over the plate without entanglement, and also to present an aesthetically pleasing shape. The corners of the plate are rounded for the same reasons.

The cover plate 22 includes a centrally located, elongated slot 24 and a pair of openings 26 on opposite sides of the slot. A pair of fasteners or machine screws 28 are carried by the plate 22, with the flat heads of the screws fitting within countersunk portions of the openings 26 so that the screw heads are flush with the outer surface of the plate. The threaded shanks of the screws preferably are significantly smaller than the openings 26 so that the screws are loosely carried and can tip or waggle relative to the plate. As will be seen, this facilitates installation of the fitting 10.

The clamping plate 12 also includes a central elongated slot 30 and openings 32 on opposite sides of the slot. The slot 30 and openings 32 are vertically aligned with the slot 24 and openings 26 in the cover plate 22.

The openings 32 are threaded to threadably receive the machine screws 28, as seen in FIG. 3, so that the plates 12 and 22 can be tightly urged against the under side and upper side, respectively, of the wall section 14 on tightening of the screws, as seen in FIG. 4.

A hook means or hook member 34 is disposed within the slots 24 and 30. It is carried by a transverse pivot pin 36 which carries the hook member 34. The pin 36 is pivotally supported at its opposite ends by a pair of channels 38 which depend from and which form an integral part of the cover plate 22. The channels 38 are spaced apart to form a continuation of the cover slot 24.

The hook member 34 includes a hook portion 40 and a body portion 42 through which the pin 36 extends. The body portion is characterized by a flat surface 44 on one edge and a curvilinear surface on the opposite edge. The curvilinear surface merges with an adjacent curvilinear surface of the hook portion 40 to define a hooking surface adapted for engagement by a cargo securing line or the like (not shown).

The hook member is pivotable about the axis of the pin 36 between the recessed position of FIG. 6 and the projected position of FIG. 7. In the recessed position the flat surface 44 is flush with the upper surface of the cover plate 22. In the projected position the flat surface 44 is engaged upon one end margin of the cover slot 24. This engagement prevents further outward pivotal movement of the hook member and acts as a stop to take the strain of any securing line engaged upon the hook portion 40.

To install the fitting 10 a user first assembles the components with the screws 28 threaded out of the plate 12 somewhat to allow easy insertion of the plate 12 within the stake hole 18, as seen in FIGS. 1 and 3. The fitting is next rotated to the position of FIGS. 2 and 4, and the screws 28 are tightened to complete the installation.

The retracted hook member 34 can be pivoted from the recessed position of FIG. 7 by pressing on the flat surface 44 on the side of the pivot pin axis opposite the hook portion 40. The partially projected hook portion 40 can then be grasped and pivoted to the position of FIG. 7. The center of gravity of the hook member 34 is such that it tends to maintain the member 34 in its projected position, in readiness for use as a securing line anchorage.

The fitting 10 is thus quickly mountable to a pickup truck side wall without having to drill any special openings. Conversely, it is quickly demountable for transfer to another vehicle, if desired.

The retraction capability of the fitting makes it aesthetically attractive and removes any potential for snagging of foreign objects when it is not in use.

Various modifications and changes may be made with regard to the foregoing detailed description without departing from the spirit of the invention.

We claim:

1. A tie down fitting for mounting to a vehicle cargo bed side wall having a horizontal section provided with a stake hole, the fitting comprising;
    a clamping plate having a central slot and threaded openings on opposite sides of the slot, and dimensioned for passage through the stake hole for engagement with the underside of the side wall section;
    a cover plate for engagement with the upper side of the section in covering relation to the stake hole, and including a central slot and openings on opposite sides of the slot for alignment with the central slot and threaded openings of the clamping plate, respectively;
    anchor means aligned with the central slots of the clamping and cover plates and carried by the cover plate for pivotal movement between a recessed position in which the anchor means is flush with the upper side of the cover plate, and a projected position wherein a portion of the hook means is located above the upper side of the cover plate for engagement by a cargo securing line or the like; and
    fastener means carried within the cover plate openings and threadably engaging the threaded openings in the clamping plate for preassembly into a single unit for insertion of the clamping plate through the stake hole, and for positioning the unit for orienting the clamping plate across the stake hole whereby the cover and clamping plates may be tightly urged against the section upper side and underside, respectively, as the fastener means are actuated.

2. A tie down fitting according to claim 1 wherein the anchor means is pivotable about an axis lying between the opposite extremities of the anchor means whereby the anchor means can be pivoted upwardly from the recessed position by pressing upon one extremity of the anchor means.

3. A tie down fitting according to claim 2 wherein the center of gravity of the anchor means in its projected position tends to maintain the anchor means in the projected position.

4. A tie down fitting for mounting to a vehicle cargo bed side wall having a horizontal section provided with a stake hole, the fitting comprising:
    a clamping plate having a central slot and threaded openings on opposite sides of the slot, and dimensioned for passage through the stake hole for engagement with the underside of the side wall section;
    a cover plate for engagement with the upper side of the section in covering relation to the stake hole, and including a central slot and openings on opposite sides of the slot for alignment with the central slot and threaded openings of the clamping plate, respectively;

anchor means carried by the cover plate and aligned with the central slots of the clamping and cover plates for pivotal movement between recessed and projected positions, the anchor means including a hook portion located below the underside of the cover plate in the recessed position; and further including a body portion located flush with the underside of the cover plate, in the recessed position, the hook portion being located above the upper side of the cover plate and the body portion being engaged upon an end margin of the cover plate slot in the projected position; and headed fastener means carried within the cover plate openings and threadably engaging the threaded openings in the clamping plate for preassembly into a single unit for insertion of the clamping plate through the stake hole, and for positioning the unit for orienting the clamping plate across the stake hole whereby the cover and clamping plates may be tightly urged against the section upper side and underside, in the clamping plate for preassembly into a single unit for insertion of the clamping plate through the stake hole, and for positioning the unit for orienting the clamping plate across the stake hole respectively, as the fastener means are actuated.

5. A tie down fitting according to claim 4 wherein the cover plate includes a pair of depending slot defining walls pivotally mounting the hook portion.

6. A tie down fitting according to claim 5 and including pivot means extending between the hook portion and the slot defining walls.

* * * * *

UNITED STATES PATENT AND TRADEMARK OFFICE
CERTIFICATE OF CORRECTION

PATENT NO. : 4,762,449

DATED : August 9, 1988

INVENTOR(S) : Frank H. St. Pierre and Jack D. Jensen

It is certified that error appears in the above-identified patent and that said Letters Patent is hereby corrected as shown below:

Column 4, line 33, delete "hook" and insert --anchor--; and

Column 6, lines 5-9, delete "in the clamping plate for preassembly into a single unit for insertion of the clamping plate through the stake hole, and for positioning the unit for orienting the clamping plate across the stake hole".

Signed and Sealed this

Tenth Day of January, 1989

Attest:

DONALD J. QUIGG

*Attesting Officer*   *Commissioner of Patents and Trademarks*